P. R. BOULTON.
AUTOMATIC GAS ANALYZER.
APPLICATION FILED APR. 15, 1913.
1,077,927.
Patented Nov. 4, 1913.
2 SHEETS—SHEET 1.
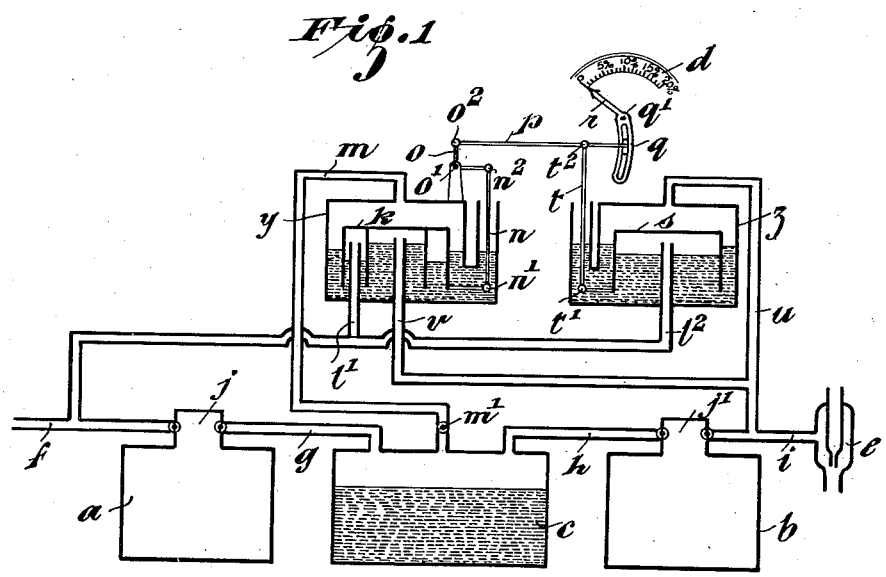
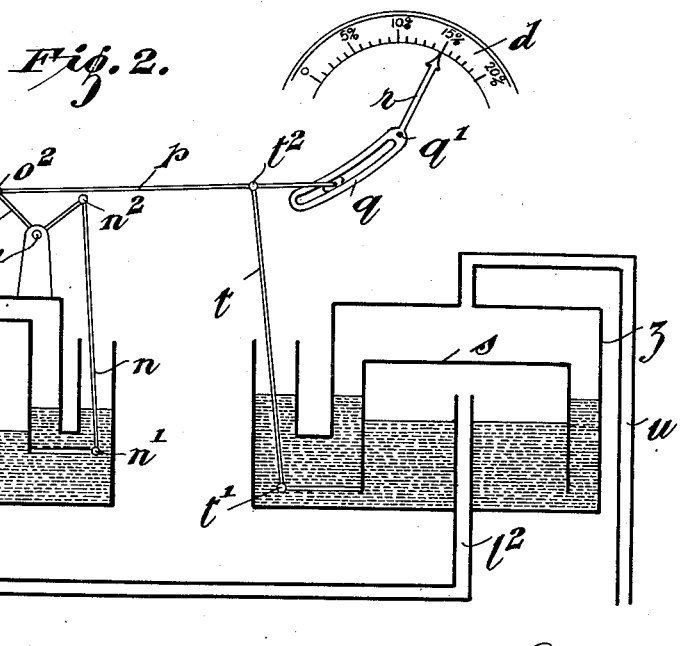

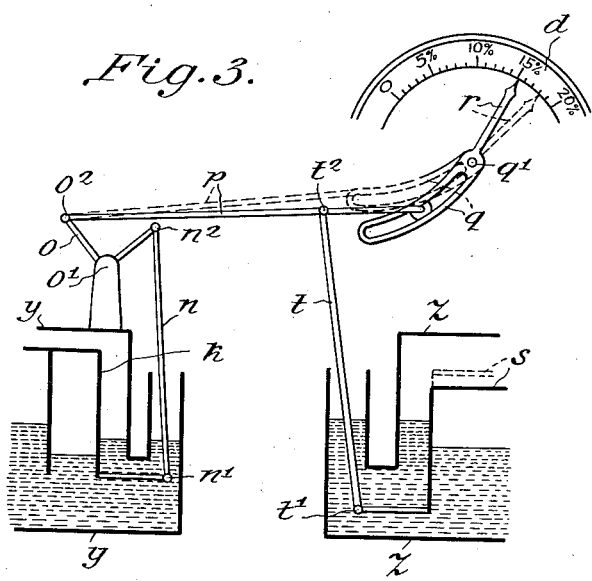
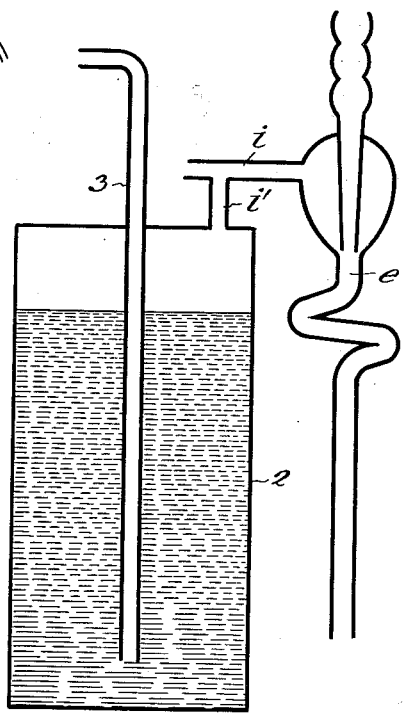
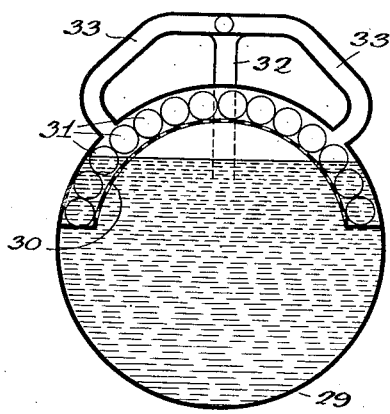
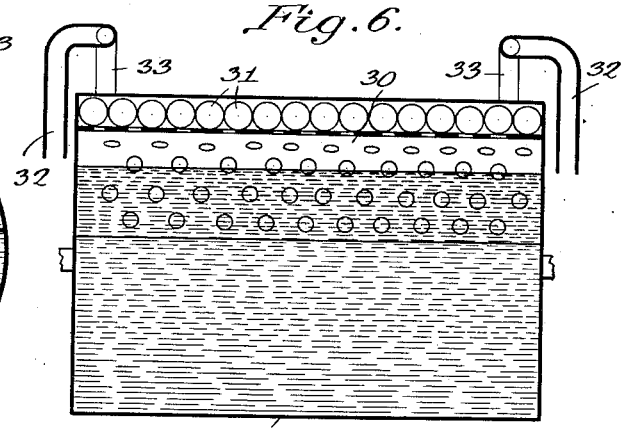

UNITED STATES PATENT OFFICE.

PERCIVAL RAYMOND BOULTON, OF BIRMINGHAM, ENGLAND.

AUTOMATIC GAS-ANALYZER.

1,077,927.

Specification of Letters Patent.

Patented Nov. 4, 1913.

Application filed April 15, 1913. Serial No. 761,277.

*To all whom it may concern:*

Be it known that I, PERCIVAL RAYMOND BOULTON, a subject of the Kingdom of Great Britain, residing at The Electricity Works, Summer Lane, Birmingham, in the county of Warwick, England, have invented certain Improvements in Automatic Gas-Analyzers, of which the following is a specification.

This invention relates to improvements in apparatus for the automatic and continuous analysis, indication, and recording of gases, and has particular application to an improved apparatus for indicating and recording the percentage of carbon dioxid in furnace fuel gases or the like, for the purpose of affording a simple and reliable indication of the efficiency of the firing and consequently of the effective working of the boiler.

While the aforesaid purpose is the primary object of this invention, I do not desire to limit the scope of its application, as with equal advantage it could be applied for indicating the percentage of gases other than carbon dioxid, with slight modifications to suit the other purposes to which it is to be applied.

The present apparatus is of the type in which the gases to be analyzed are brought into the vicinity of an absorbent adapted to absorb the gas or gases to be estimated, and the characteristic feature of my present invention exists in the fact that it operates by virtue of the pressure created or varied as a result of the absorption.

The apparatus according to my present invention involves, in combination, a pressure tank containing absorbent, a supply conduit for conveying to such pressure tank the gases to be analyzed, a conduit providing for the egress of the gases from said pressure tank, means for causing the gases to enter and leave said pressure tank, means for controlling the gases admitted to said pressure tank, means for controlling the gases egressing from said pressure tank, and means for continuously ascertaining, indicating, or recording the gases, said means operating by virtue of the pressure in said pressure tank.

The nature and construction of my apparatus, operating by pressure and involving the afore-recited combination, may vary considerably, and while several modifications are specified hereinafter, these are described by way of example, as my apparatus may assume other modified forms without departing from the essential nature or spirit of my invention.

In order that this invention may be clearly understood and readily carried into practice, reference may be had to the appended explanatory three sheets of drawings, which diagrammatically illustrate various forms of my invention, and on which:—

Figure 1 is a diagram showing one general arrangement of my apparatus. Fig. 2 repeats a part of the diagram shown in Fig. 1, but illustrates the alteration which occurs when an absorption of carbon dioxid has taken place. Fig. 3 repeats a part of the diagram shown in Fig. 2, but illustrates the operation of the means of automatic compensation which may be provided to compensate for variations in the total pressure difference. Fig. 4 illustrates an arrangement which may be employed in connection with the apparatus illustrated in Fig. 1, but in lieu of the compensating apparatus thereof. Fig. 5 illustrates in end sectional elevation, a form of absorption tank which may be used in connection with the present invention, and by which liquid absorbent may be agitated during the operation of the apparatus. Fig. 6 illustrates in sectional elevation the absorption tank shown in Fig. 5.

Referring firstly to Figs. 1, 2, and 3, two receptacles or cylinders $a$, $b$ are provided, conveniently of the same capacity, through which receptacles the gases to be analyzed successively pass, the gases entering the first receptacle $a$ from the main source of supply, by a conduit $f$. After the gases have passed through the chamber $a$, and before they enter the chamber $b$, they are caused to pass through an absorption tank $c$ containing absorbent, an indicator or gage (hereinafter more fully referred to), being associated with said pressure tank. An ejector or extractor $e$, of suitable type, is provided to produce a vacuum, or a pressure below that of the atmosphere of any convenient amount which will cause a flow of the gases from the flue, chimney, or stack of the boiler or the like, the gases passing first through the pipe $f$ into the receptacle $a$ and then through a pipe $g$ over the surface of the absorbent in the tank $c$. The absorbent employed in the analysis of gases containing carbon dioxid may for instance be caustic potash solution, and the gases after the extraction of any carbon dioxid due to the passage through the absorbent tank pass through the pipe $h$ to the second receptacle $b$ and through the pipe $i$ to the ejector $e$. Connected with the receptacle $a$ is a valve or valves $j$ which is arranged to alternately open the said receptacle to its inlet pipe $f$ and to its discharge pipe $g$, and a similarly acting valve $j^1$ is connected to the receptacle $b$, the arrangement being such as to provide for an intermittent flow from the flue, to which is connected the pipe $f$, of the gases to be analyzed successively through the receptacle $a$, absorbent tank $c$, and receptacle $b$ to the ejector $e$. A gage or indicator $d$ of the float and liquid type is arranged to indicate the difference between the pressures between the receptacle $a$ and the absorbent tank $c$, and the absorbent tank $c$ and the receptacle $b$.

The method of operation may be expressed in the following manner. The receptacle or vessel $a$ is alternately opened to the pipe $f$ connected to the flue and to a pipe $g$ connected to the absorption tank $c$. The receptacle or vessel $b$ is alternately connected to the tank $c$ by the pipe $h$ and by the pipe $i$ to an ejector or other suitable means $e$ for producing a vacuum, or a pressure below that of the flue, thus inducing a flow of gases through the tank $c$ containing a caustic potash or other absorbent solution. By means of suitable valves a cycle of operation is carried out as follows:—1. The vessel or receptacle $a$ is opened to the flue, the gases contained in vessel or receptacle $a$ equal the pressure in the flue, and communication between $a$ and the flue is cut off. 2. The vessel or receptacle $b$ is opened to the ejector $e$ and the gases contained in $b$ are reduced to the pressure produced by the ejector and communication between the receptacle $b$ and the ejector is cut off. 3. Communication between the vessels $a$, $b$ and $c$ is preferably simultaneously established when the pressure equalize, then communication is cut off. Operations 1 and 2 preferably take place simultaneously. It will be seen therefore that gases are induced to flow through the tank $c$ over the surface of the absorbent and provided no gas is absorbed, the pressure in the tank $c$ will be equal to the mean between the pressure at the inlet from the flue and the pressure at the outlet to the ejector. If, however, a percentage of the gas passing into the tank $c$ is absorbed, then the pressure in that tank will be less than the mean, and the amount of this difference is an indication of the percentage absorbed. I thus employ an equalizing means between the inlet and outlet points of the apparatus by which the mean of the pressures of the gases is balanced, and this equalization or balancing is made the zero point of the indicator or gage, whereby any variation of the pressure of the gases due to absorption is indicated. When the difference in pressure between the inlet and the absorbent is equal to the pressure between the absorbent and the outlet, the gage or indicator reads zero.

The gage to which reference has previously been made is adapted to measure the amount by which the pressure at the absorbent tank differs from the mean of the two extreme pressures expressed as a percentage of the difference between these two extreme pressures, and it comprises a float $k$ of the inverted bell type having multiple chambers as shown, into which the pipes $l^1$ and $v$ enter. The float $k$ is mounted within a tank $y$ in which there is a suitable amount of liquid neutral to the gases under analysis. A pipe $m$ connects the upper part of the absorption tank $c$ with the upper part of the tank $y$. Attached to the float $k$, which is influenced by the gases passing through the absorbent tank, is a system of linkage comprising a rod $n$ pivoted at $n^1$ to the float $k$, and pivoted at $n^2$ to a bell-crank $o$ hinged at $o^1$ to a bracket on the tank $y$, and pivotally connected at $o^2$ to a rod $p$, the rod $p$ being slidably connected to a slotted quadrant $q$ hinged at $q^1$, the quadrant having an indicating finger $r$ thereon or connected therewith, said finger indicating against a suitably graduated chart or index of the gage $d$. The said linkage moves relative to the percentage of carbon dioxid absorbed from the gases. Fig. 1 illustrates the zero (or no carbon dioxid) position of the linkage, and Fig. 2 illustrates the position of the linkage when say 15% of carbon dioxid has been absorbed. In order to compensate for any variation of pressure difference, between the gases before entering the receptacle $a$ and after leaving the receptacle $b$, and to allow of the indicator giving a correct reading, I provide a correction device connected with the gage $d$, comprising an additional float $s$ and tank $z$; connected to the said float $s$ is linkage which is connected to the aforesaid linkage, and is so arranged that should any angular movement of the slotted quadrant $q$ take place, the indicator finger $r$ is moved a proportionately greater or less distance over the chart or index of the gage $d$, thus forming an automatic compensator for any variations of the total pressure difference. The linkage connected with the floats $s$ comprises a rod $t$ pivoted at $t^1$, and pivotally connected at $t^2$ with the rod $p$, reference to Fig. 3 of the drawings will illustrate by a comparison of the full and dotted line positions thereof, the operation of this compensating device assuming the float $s$ has risen; obviously a fall of the float $s$ would effect a contrawise movement of the finger $r$. If, however, no carbon dioxid is present in the gases and the gage finger $r$ indicates zero, any rise and fall of the float $s$ will by means of the rod $t$ move the rod $p$ about its pivot $o^2$, but will not affect the finger $r$ as the movement will be lost in the slotted quadrant $q$, the arc of the slot being struck from the pivot $o^2$. The pipe $l^2$ connected with the inlet pipe $f$, and the pipe $u$ connected with the outlet pipe $i$ enter the tank $z$, respectively inside and outside of the float $s$ therein.

The operation of the apparatus will now be more fully described: Assuming that the gases passing through the apparatus contain no carbon dioxid, then the amount of gas entering the apparatus is equal to the amount discharged therefrom, and consequently the pressure difference hereinbefore referred to, will be equal and the gage $d$ indicate zero. Assuming, however, that a percentage of carbon dioxid, (say 15 %) is present, the indicator $r$ of the gage $d$ will take up a different position, such position being preferably expressed as a percentage. This position is seen in Fig. 2 of the accompanying diagrams.

In operation, the speed of the two valves $j$ and $j^1$ connected to the receptacles $a$ and $b$ respectively, must be synchronized, they may be combined in one valve, by placing the receptacles $a$ and $b$ adjacent to one another, or operated from any convenient source of power at a convenient speed, say two revolutions per minute, but such means of operation are not a feature of this invention. The indicating float $k$ of the gage $d$ may be in addition or alternatively arranged to operate a recording stylus contacting with a revolving drum operated by clockwork or the like, and from which a permanent record may be obtained.

The arrangement shown in Fig. 4, which may be used in lieu of the compensating tank $z$ in Fig. 1, comprises a tank 2 containing water or other suitable liquid and the upper part of which tank above the surface of the water is in communication by a conduit $i^1$ with the conduit $i$ connecting the receptacle $b$ with ejector $e$. A conduit 3 enters the tank 2 passing to a position suitably below the surface of the liquid therein, the said conduit 3 being in communication with the source from which the gases to be analyzed are obtained, or with the pipe $f$ connecting such source with the receptacle $a$, so as to permit of gases from the flue bubbling through the liquid in the tank 2. By the use of the apparatus shown in Fig. 4, the difference of pressure in the pipes $f$, $i$, is maintained constant and it is thus unnecessary to provide an apparatus such as $z$ adapted to compensate for changes in the pressure difference. The pressure difference maintained by means of the tank 2 is determined by the head of liquid in such tank, and it will be obvious that this head must be maintained constant, thereby determining and maintaining the vacuum produced by the ejector; that is the pressure of gas in the tank 2 is less than the pressure in the flue by a constant amount.

In the arrangement shown in Fig. 1, either in cases in which the compensating element $z$ is employed or in which the apparatus shown in Fig. 4 is employed, I advantageously provide a valve $m^1$ in the conduit $m$, the said valve being so operated as to close or isolate the pressure tank $c$ except throughout the time during which it is in communication with the other tanks.

The special form of absorbent tank shown in Figs. 5 and 6 which may be used in connection with the present invention, is comprised of a cylindrical tank 29 arranged on a horizontal axis and mounted to be oscillated on such axis advantageously automatically. The said tank 29 is furnished internally with a perforated partition 30 adapted to carry members 31 of any suitable form adapted to offer a large surface to the liquid absorbent. By the oscillations of the casing the members 31 are intermittently submerged and extracted from the liquid absorbent, the arrangement being such that while the articles 31 on one side of the casing are submerged, articles 31 on the other side of the casing are raised above the surface of the liquid after being freshly coated. The conduits 32 offering communication with the interior of the casing 29, to and from which conduits 32 the gas is conveyed through the medium of flexible conduit connections, are each bifurcated or branched into two conduits 33 which communicate with the casing at different points in its circumference, in such a manner that when the casing aperture pertaining to one conduit 33 is submerged, the casing aperture pertaining to the other conduit 33 is elevated above the surface of the liquid, thus offering a free passage for the gases under any circumstance of movement of the casing 29.

What I claim as my invention and desire to secure by Letters Patent is:—

1. Apparatus for the analysis of gases, having, in combination, an absorption tank containing an absorbent, a supply conduit for conveying to said tank the gases to be analyzed, an ingress receptacle associated with such supply conduit, and through which the gases are adapted to pass before arriving at the absorption tank, an egress conduit providing for the egress of the gases from said absorption tank, a receptacle associated with said egress conduit, and through which the gases are adapted to pass after leaving the pressure tank, means for causing the gases to successively traverse the ingress receptacle, the pressure tank, and the egress receptacle, means for controlling the passage of the gases to and from the ingress receptacle, means for controlling the passage of the gases to and from the egress receptacle such last-mentioned means being adapted to operate in appropriate relationship with the controlling means pertaining to the ingress receptacle, and means for determining the percentage of gas constituent absorbed, said means being adapted to compensate for the variations in pressure in the gas before entering the ingress receptacle and after leaving the egress receptacle.

2. Apparatus for the analysis of gases, having, in combination, an absorption tank containing absorbent, a supply conduit for conveying to said tank the gases to be analyzed, an ingress receptacle associated with such supply conduit, and through which the gases are adapted to pass before arriving at the absorption tank, an egress conduit providing for the egress of the gases from said absorption tank, an egress receptacle associated with said egress conduit, and through which the gases are adapted to pass after leaving the absorption tank, means for causing the gases to successively traverse the ingress receptacle, the pressure tank, and the egress receptacle, means for controlling the passage of the gases to and from the ingress receptacle, means for controlling the passage of the gases to and from the egress receptacle, such last-mentioned means being adapted to operate in appropriate relationship with the controlling means pertaining to the ingress receptacle, means for maintaining constant the difference of pressure between the gases before entering the ingress receptacle, and the gases after leaving the egress receptacle, and means for determining the percentage of gas constituent absorbed, said means being adapted to compensate for the variations in pressure in the gas before entering the ingress receptacle and after leaving the egress receptacle.

3. A gas analyzing apparatus comprising in combination, an absorption tank containing an absorbent substance, means for flowing gas through said tank, and pressure responsive mechanism connected to said tank and adapted in conjunction with said tank, to determine the percentage of gas constituent absorbed, said mechanism being adapted to compensate for the variations in pressure in the gas before entering the apparatus.

In witness whereof I have hereunto set my hand in the presence of two witnesses.

PERCIVAL RAYMOND BOULTON.

Witnesses:
 ARTHUR BROWN,
 ARCHIBALD LAMB.